United States Patent
Skiba et al.

(10) Patent No.: US 9,455,455 B2
(45) Date of Patent: Sep. 27, 2016

(54) EVAPORATIVELY COOLED FUEL CELLS WITH WATER PASSAGEWAYS ENHANCED BY WICKS

(75) Inventors: Tommy Skiba, East Hartford, CT (US); Robert M. Darling, South Windsor, CT (US)

(73) Assignee: Audi AG, Ingolstadt (DE)

( * ) Notice: Subject to any disclaimer, the term of this patent is extended or adjusted under 35 U.S.C. 154(b) by 303 days.

(21) Appl. No.: 13/261,627

(22) PCT Filed: Oct. 6, 2010

(86) PCT No.: PCT/US2010/002691
§ 371 (c)(1),
(2), (4) Date: Apr. 1, 2013

(87) PCT Pub. No.: WO2012/047184
PCT Pub. Date: Apr. 12, 2012

(65) Prior Publication Data
US 2013/0224622 A1    Aug. 29, 2013

(51) Int. Cl.
*H01M 8/02* (2016.01)
*H01M 8/24* (2016.01)
(Continued)

(52) U.S. Cl.
CPC ......... *H01M 8/04059* (2013.01); *H01M 8/023* (2013.01); *H01M 8/0258* (2013.01);
(Continued)

(58) Field of Classification Search
CPC ............. H01M 8/023; H01M 8/0258; H01M 8/0267; H01M 8/04074; H01M 8/04059
USPC ................ 429/482, 434, 457, 468, 512, 518
See application file for complete search history.

(56) References Cited

U.S. PATENT DOCUMENTS 6,472,095 B2   10/2002   Margiott
7,504,170 B2    3/2009   Reiser et al.
(Continued)

FOREIGN PATENT DOCUMENTS

CN        101107743 A    1/2008
WO        2007/086828 A2    8/2007
(Continued)

OTHER PUBLICATIONS

Interdigitate. Dictionary.com. Dictionary.com Unabridged. Random House, Inc. http://dictionary.reference.com/browse/interdigitate (accessed: Jul. 21, 2015).*

(Continued)

*Primary Examiner* — Sean P Cullen
(74) *Attorney, Agent, or Firm* — Seed IP Law Group PLLC

(57) ABSTRACT

Fuel cells (38) have passageways (83, 84) that provide water through one or both reactant gas flow field plates (75, 81) of each fuel cell, whereby the fuel cell is cooled evaporatively. The water passageways may be vented by a porous plug (not shown), or by a microvacuum pump (89). A condenser (59) may have a reservoir (64); the condenser (59) may be a vehicle radiator. A highly water permeable wicking layer (90) is disposed adjacent to one or both water passageways (83, 84) which exist between individual fuel cells (38). The passageways may be flow-through passageways (83) (FIG. 5) or they may be interdigitated passageways (83a, 83b) (FIG. 6) in order to increase the flow of water-purging air through the wicking layer (90) utilized to clear the stack of water during shutdown in cold environments. The inlet interdigitated channels (83c, 83d) may be only partially blocked at their outlet ends such as by a protrusion (104) or a hole (106) in order to ensure that any gas entering the inlet coolant passageways (83c, 83d) will not accumulate at the outlet end (101) of the inlet coolant passageways.

9 Claims, 3 Drawing Sheets

(51) Int. Cl.
*H01M 8/04* (2016.01)
*H01M 8/10* (2016.01)

(52) U.S. Cl.
CPC ....... *H01M8/0267* (2013.01); *H01M 8/04074* (2013.01); *H01M 2008/1095* (2013.01); *Y02E 60/50* (2013.01); *Y02E 60/521* (2013.01)

(56) References Cited

U.S. PATENT DOCUMENTS

| | | |
|---|---|---|
| 2001/0041281 A1 | 11/2001 | Wilkinson et al. |
| 2002/0106546 A1 | 8/2002 | Perry et al. |
| 2003/0039877 A1 | 2/2003 | Dufner et al. |
| 2003/0129468 A1 | 7/2003 | Issacci et al. |
| 2004/0067405 A1 | 4/2004 | Turpin et al. |
| 2005/0106434 A1* | 5/2005 | Shimotori et al. ............. 429/26 |
| 2006/0141331 A1 | 6/2006 | Reiser et al. |
| 2007/0154744 A1* | 7/2007 | Darling et al. ................. 429/13 |
| 2008/0038610 A1 | 2/2008 | Darling |
| 2010/0015483 A1* | 1/2010 | Yang .............................. 429/24 |
| 2010/0119911 A1 | 5/2010 | Reiser et al. |

FOREIGN PATENT DOCUMENTS

| | | |
|---|---|---|
| WO | 2008/105751 A2 | 9/2008 |
| WO | 2009/128832 A1 | 10/2009 |
| WO | 2009/131581 A1 | 10/2009 |

OTHER PUBLICATIONS

Intersperse. Dictionary.com. Dictionary.com Unabridged. Random House, Inc. http://dictionary.reference.com/browse/intersperse (accessed: Oct. 8, 2015).*
Mingle. Dictionary.com. Dictionary.com Unabridged. Random House, Inc. http://dictionary.reference.com/browse/mingle (accessed: Oct. 8, 2015).*
Intermingle. Dictionary.com. Dictionary.com Unabridged. Random House, Inc. http://dictionary.reference.com/browse/intermingle (accessed: Oct. 8, 2015).*
Interweave. Dictionary.com. Dictionary.com Unabridged. Random House, Inc. http://dictionary.reference.com/browse/interweave (accessed: Oct. 8, 2015).*
Interlock. Dictionary.com. Dictionary.com Unabridged. Random House, Inc. http://dictionary.reference.com/browse/interlock (accessed: Oct. 8, 2015).*
Interlace. Dictionary.com. Dictionary.com Unabridged. Random House, Inc. http://dictionary.reference.com/browse/interlace (accessed: Oct. 9, 2015).*
International Search Report, mailed Jul. 18, 2011, for International Application No. PCT/US2010/002691, 2 pages.

* cited by examiner

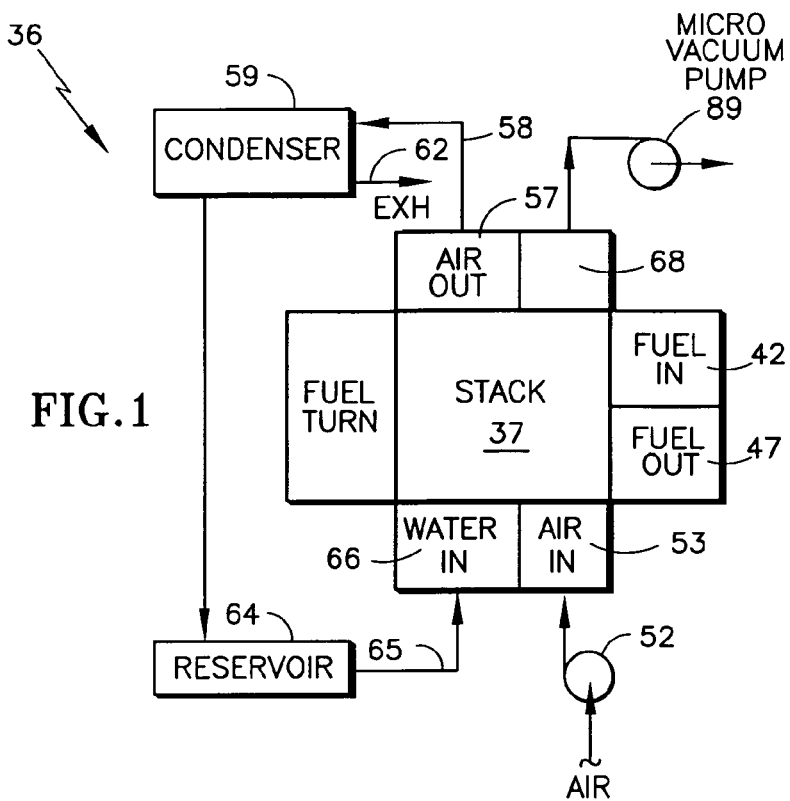

FIG.5
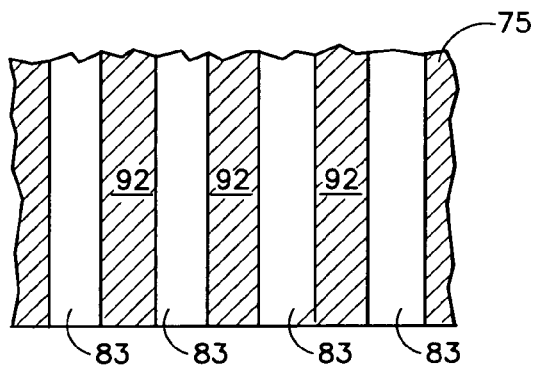
FIG.6
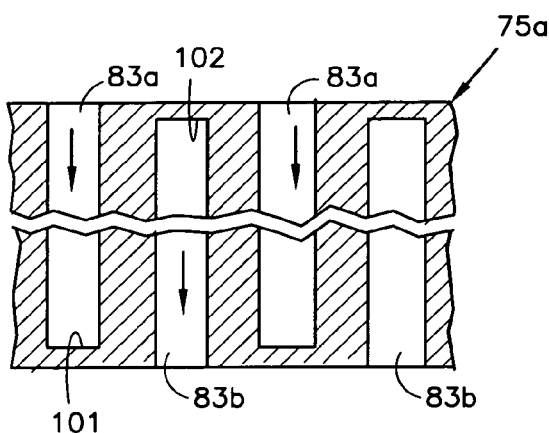
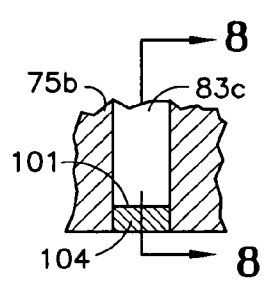
FIG.7
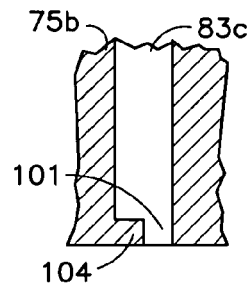
FIG.8
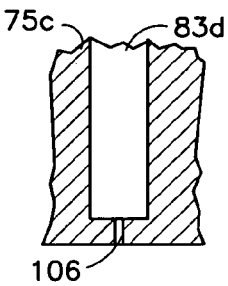
FIG.9

EVAPORATIVELY COOLED FUEL CELLS WITH WATER PASSAGEWAYS ENHANCED BY WICKS

TECHNICAL FIELD

Fuel cells having water passageways, with water permeable wick layers between them, provide water to reactant gas flow passageways wherein the water is evaporated in proportion to the waste heat generated in the cells; the water condensed from the exhausted reactant gas is returned to the water passageways. Optionally, the passageways may be in the form of an interdigitated flow field, to increase removal of water from the wick during water purging, at shutdown.

BACKGROUND ART

It is known in the proton exchange membrane fuel cell art to evaporatively cool fuel cells, thereby deriving the benefit of the heat of vaporization, in contrast with conveying sensible heat to circulating water passing through the cells or coolant passing through coolant plates. One example is shown in U.S. Pat. No. 7,504,170, which is incorporated herein by reference.

In some applications, such as in vehicles, extremely high current densities are preferred in order to support high vehicle performance. High current densities increase water production, which requires assured flow through porous, hydrophilic reactant gas flow field plates, hereafter also referred to as "water transport plates". Furthermore, increased power density requires assured cooling and humidification of the membrane.

For high performance, the very best communication of water between water passageways and the water transport plates is beneficial.

SUMMARY

According to the subject matter hereof, fuel cells in a fuel cell power plant are evaporatively cooled by means of water present in passageways which are adjacent to or within a first surface of at least one of the hydrophilic, porous reactant gas flow field plates, which have reactant gas flow channels opening at a second surface of the flow field plates, opposite to said first surface. Each passageway is in fluid communication with a water reservoir. In addition, the water uptake by the flow field plates is increased by a water permeable wick layer between the flow field plates, and in intimate contact with all of the water passageways. The water supply in the passageways is enhanced by means of the water permeable wick layer adjacent to water in one or more of the passageways.

It has been found that a fuel cell power plant in a climate which may fall below the freezing temperature of water requires removal of at least most of the water from the fuel cell stack during shutdown. This reduces the propensity to have potentially catastrophic mechanical stresses during the period of non-use of the fuel cell, and blockage (by ice) of reactant gas at startup. The reduction of water in a fuel cell stack employing a water permeable wick by blowing air through the water passageways has been found to provide an inadequate removal of water from the water permeable wicks.

The subject matter herein further includes utilization of interdigitated coolant water flow fields which ensure that the purging air will transfer into and flow through the water permeable wick, thereby forcing more water therefrom. In one embodiment, normal conventional interdigitated flow fields are used. In another embodiment, interdigitated flow fields having less than a complete blockage at the outlet ends of the inlet flow fields assures the ability of gas (typically leaking into water passageways from the reactant flow fields) to escape the flow fields, thereby avoiding blockage of water flow and dry out of the membrane.

Other variations will become more apparent in the light of the following detailed description of exemplary embodiments, as illustrated in the accompanying drawings.

BRIEF DESCRIPTION OF THE DRAWINGS

FIG. 1 is a simplified block diagram of a vented embodiment of an evaporatively cooled fuel cell power plant which may incorporate the subject matter hereof.

FIG. 2 is a partial, sectioned side elevation view of a fuel cell employing the subject hereof, with sectioning lines omitted for clarity.

FIG. 5 is a partial section taken on the line 5-5 of FIG. 4 with flow through passageways.

FIG. 6 is a partial section taken on the line 5-5 of FIG. 4 with alternative, interdigitated flow passageways.

FIG. 7 is a fragmentary section taken on the line 5-5 of FIG. 4, illustrating partial obstruction of the outlet end of the inlet passageways.

FIGS. 8 and 9 are fragmentary sections taken on the line 8-8 of FIG. 7.

MODE(S) OF IMPLEMENTATION

Figure 3:
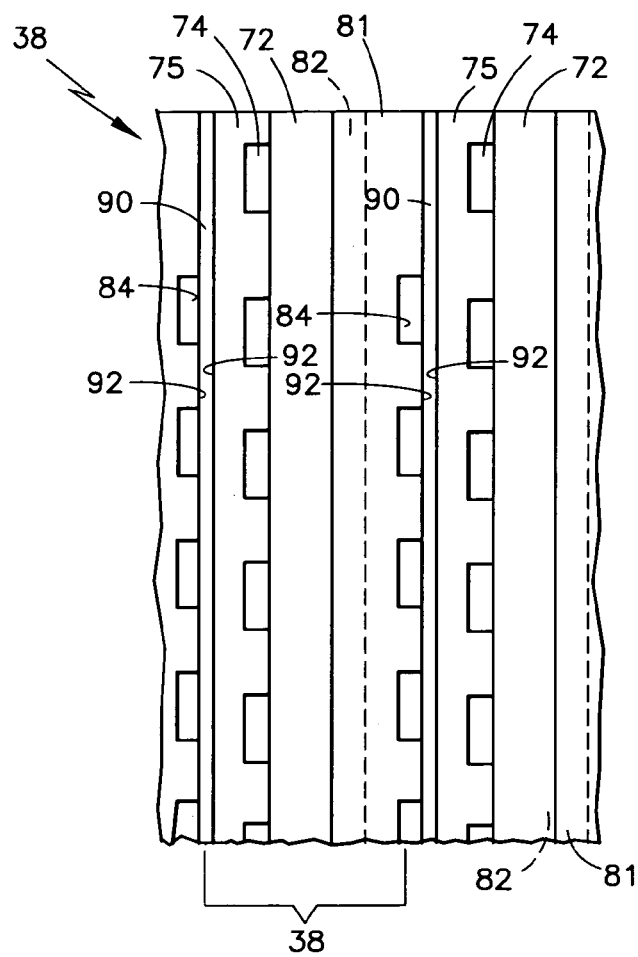
FIG. 3 is a partial, sectioned side elevation view of a variant of FIG. 2, where only one of the separator plates (reactant flow field plates) has water passageways.

Referring now to FIG. 1, a fuel cell power plant 36, which may embody the subject matter herein, includes a stack 37 of fuel cells 38 (FIG. 2) which are shown disposed vertically, although they may be disposed horizontally.

In this embodiment, fuel is provided to a fuel inlet 42 and flows to the right in a first fuel pass, and then flows downwardly and to the left through a fuel outlet 47. The fuel may flow through a recycle pump (not shown) back to the fuel inlet, and may be periodically purged to ambient through a valve (not shown). Single pass, triple pass or other fuel flow configurations may be used.

In the embodiment of FIG. 1, air is provided by a pump 52 to an air inlet 53, and the air flows upwardly through the oxidant reactant gas flow channels of the fuel cells 38. From an air outlet 57, the air flows over a conduit 58 to a condenser 59, which in a vehicle may be a conventional radiator. The exit air is passed through an exhaust 62. The condensate from the condenser 59 may be accumulated in a reservoir 64, which is connected by a water return conduit 65 to a water inlet 66. The water then flows through passageways 83, 84 (FIG. 2) into each of the fuel cells 38; the passageways 83, 84 may terminate in a manifold 68, at which removal of gas from the passageways is provided through a vent, such as a micro vacuum pump 89, of the type utilized for a 37 liter (10 gallon) aquarium, which can be bought for several dollars, for the sole purpose of supplying sufficient head (water pressure) to ensure that the water level reaches the uppermost portions of the passageways in the stack 37. The pump 89 does not cause any water flow through the vent manifold 68. Alternatively, the vent manifold 68 may be vented through a porous plug or other vent (not shown).

Although there is a water inlet 66, there is no water outlet, the water is simply present in each fuel cell. In FIG. 2, one embodiment includes fuel cells 38, each of which comprises a conventional membrane electrode assembly 72, which includes an electrolyte with anode and cathode catalysts and gas diffusion layers on opposite sides of the electrolyte. It should be understood that the drawings herein are not at all to scale; no significance should be paid to the apparent different size of water passageways 83, 84 herein and those in the aforementioned patent.

In the embodiment of FIG. 2, fuel reactant gas flows through horizontal channels 74 in a hydrophilic, porous substrate 75, which in this embodiment includes grooves which form a water passageway 83. On the cathode side, a hydrophilic, porous oxidant reactant gas flow field plate 81 includes vertical air flow channels 82 and grooves which form a water passageway 84. The hydrophilic porous fuel reactant gas flow field plates 75 and the hydrophilic porous oxidant reactant gas flow field plates 81 are otherwise also referred to as "water transport plates".

In accordance with a first aspect of the subject matter herein, the fuel cells 38 of FIG. 2 include water permeable wicks 90 between the water passageways 83, 84. The wicks 90 may be thicker or thinner than the water transport plates 75, 81.

The water permeable wicks 90 may comprise a suitable, readily available carbon paper, such as Toray H-060 which has been suitably treated, such as with tin, or a tin-containing compound or mixture, to render it sufficiently hydrophilic so to assure the desired permeability to water.

With the water permeable wick 90 adjacent to the lands or ribs 92 of the water transport plates 75, 81, the lands 92 provide additional surface area of the water transport plates which assist in transferring water. In contrast, in the aforesaid patent, water transfers between the water passageways and the water transport plates only through the surfaces of the water passageways.

In the embodiment of FIG. 2, the increase in surface area between available water, including that in the wicks 90, may be at least fourfold and perhaps as much as tenfold compared with the non-wick system of the aforementioned patent.

FIG. 3 illustrates that the subject wicks 90 may be used with fuel cells having water passageways 84 in only the air flow field plates 81, on the cathode side. The wick 90 could as well be used instead in fuel cells having water passageways 83 in only the fuel flow field plates. With the wicks 90 in place in the embodiments of FIG. 3 and FIG. 4, the surface is at least doubled, and may increase as much as fivefold compared with prior systems having only water passageways 83, 84 without any wicks 90.

Figure 4:
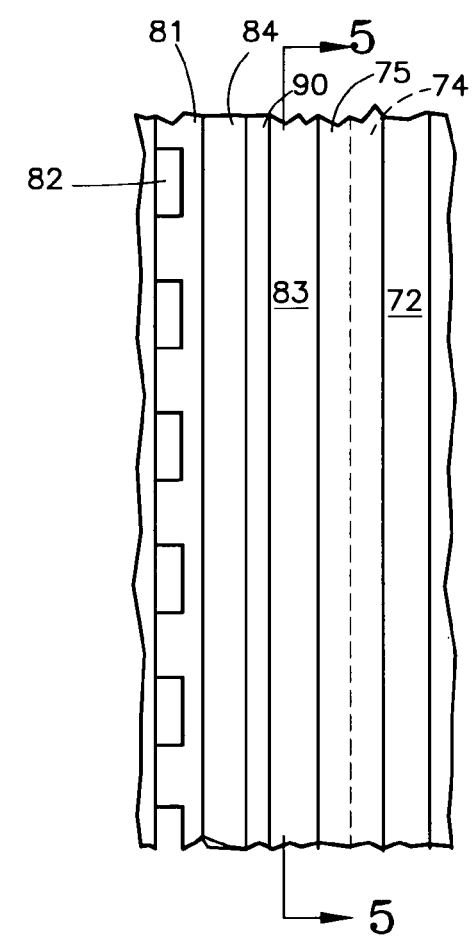
FIG. 4 is a partial, sectioned top view of the subject matter of FIG. 2.

FIG. 4 is a view looking down on a section of FIG. 2. The view is of two water passageways 83, 84, with the fuel channels 74 looking vertical and the air channels 82 looking horizontal.

Referring to FIG. 5, a first embodiment of the present invention utilizes flow through water passageways 83. Because the water is removed during shutdown in ambient regions where the surroundings of the fuel cell power plant may go below the freezing point of water, it is desirable to remove as much water as possible from the fuel cell stack. It has been found that in the embodiments of FIGS. 2 and 3, utilizing flow through water passageways 83 as illustrated in FIG. 5, purging the water passageways 83, 84 with flow of air does not remove sufficient water. An excessive amount of water remains, particularly in the permeable wicks 90, after the water passageways have been mostly cleared by purging with air.

To improve the clearance of water from the fuel cell stack, and particularly from the water permeable wicks 90, the passageways may be formed in an interdigitated fashion, as illustrated in FIG. 6. In this figure the interdigitated water passageways comprise inlet water passageways 83a which are blocked at the outlet ends 101 thereof and the outlet passageways 83b that are blocked at the inlet ends 102 thereof, as is conventional with interdigitated flow fields. This increases the pressure sufficiently to drive air supplied to the passageways 83a through the water permeable wick 90 as well as through the porous hydrophilic water transport plate 75a thereby to increase water removal in accordance with a second aspect of the subject matter herein.

Another embodiment of the invention similar to FIG. 6 is shown in FIGS. 7 and 8. The outlet end 101 of the inlet passageways 83c are not completely closed off, but are provided with a partial enclosure 104 which is not drawn to any scale. The purpose of this is to ensure that any gas bubbles which may enter into the inlet water passageways 83c will not become trapped therein and thereby impede the flow of water into the adjacent ribs of the water transport plate 75b and the adjacent water permeable wick 90 (shown in FIGS. 2 and 3).

Instead of a blockage 104, the outlet end 101 of the inlet water passageways 83d may simply have a small hole 106 therein, as illustrated in FIG. 9. The hole 106 is larger than the pore size of the water transport plate 75c, to facilitate gas removal without lowering the water pressure in the inlet water passageways 83d to any meaningful extent.

Since changes and variations of the disclosed embodiments may be made without departing from the concept's intent, it is not intended to limit the disclosure other than as required by the appended claims.

The invention claimed is:

1. A fuel cell comprising:
   a flow field plate including a first surface and a second surface opposite to the first surface, the first surface including a reactant flow field and the second surface including an interdigitated coolant flow field, the interdigitated coolant flow field including inlet passageways having blocked outlet ends and outlet passageways having blocked inlet ends, wherein the blocked outlet ends include partial enclosures; and
   a wick layer adjacent to the coolant flow field.

2. The fuel cell of claim 1 wherein the interdigitated coolant flow field is configured to drive air supplied to the inlet passageways through the wick layer.

3. The fuel cell of claim 1 wherein the interdigitated coolant flow field is configured to drive air supplied to the inlet passageways through the flow field plate.

4. A fuel cell comprising:
   a porous flow field plate including a first surface and a second surface opposite to the first surface, the first surface including a reactant flow field and the second surface including an interdigitated coolant flow field, the interdigitated coolant flow field including inlet passageways having blocked outlet ends and outlet passageways having blocked inlet ends, wherein the blocked outlet ends include holes larger than a pore size of the porous flow field plate; and
   a wick layer adjacent to the coolant flow field.

5. The fuel cell of claim 4 wherein the interdigitated coolant flow field is configured to drive air supplied to the inlet passageways through the wick layer.

6. The fuel cell of claim 4 wherein the interdigitated coolant flow field is configured to drive air supplied to the inlet passageways through the flow field plate.

7. A fuel cell comprising:
- a membrane electrode assembly having an electrolyte with cathode and anode catalysts disposed on opposite sides thereof and a gas diffusion layer facing each of the cathode and anode catalysts;
- a fuel reactant gas flow field plate having fuel reactant gas flow channels along a first surface thereof;
- an oxidant reactant gas flow field plate having oxidant reactant gas flow channels on a first surface thereof;
- wherein at least one of the flow field plates is porous and hydrophilic;
- a water passageway disposed on a second surface of the at least one of the flow field plates, the second surface being opposite to the first surface of the respective flow field plate;
- a water permeable wick layer disposed adjacent to the water passageway; and
- wherein the water passageway comprises an interdigitated flow field having inlet passageways with blocked outlet ends, the outlet ends having respective holes configured to allow a gas to escape, the holes being larger than a pore size of the at least one of the flow field plates.

8. The fuel cell of claim 7 wherein the interdigitated flow field is configured to drive air supplied to the inlet passageways through the water permeable wick layer.

9. The fuel cell of claim 7 wherein the interdigitated flow field is configured to drive air supplied to the inlet passageways through the at least one of the flow field plates.

* * * * *